United States Patent [19]

Cory et al.

[11] 4,373,737
[45] Feb. 15, 1983

[54] GAME CARRIER

[76] Inventors: Thomas R. Cory, 2354 Tecumseh, Brooklyn, Mich. 49230; Lyman R. Cory, 13861 Vischer, Brooklyn, Mich. 48230; Edward P. Maloney, 22170 W. Nine Mile, Southfield, Mich. 48034

[21] Appl. No.: 199,470

[22] Filed: Oct. 22, 1980

[51] Int. Cl.³ .............................................. B62B 1/04
[52] U.S. Cl. ..................................... 280/30; 280/655; 280/47.18; 297/217
[58] Field of Search ................. 280/47.37 R, 47.37 L, 280/47.37 C, 47.18, 47.17, 47.34, 30, 19, 655; 220/20, 22; 297/217; 211/182; 248/156; 224/921

[56] References Cited

U.S. PATENT DOCUMENTS

| | | | |
|---|---|---|---|
| 1,956,956 | 5/1934 | Leibo | 248/156 |
| 2,125,856 | 8/1938 | DeWitt | 220/22 |
| 2,602,675 | 7/1952 | Forman | 280/655 |
| 2,607,398 | 8/1952 | Andrews | 248/156 |
| 2,958,425 | 11/1960 | Best | 211/182 X |
| 3,537,721 | 11/1970 | Warner, Jr. | 280/47.17 |
| 3,948,579 | 4/1976 | Schirmer | 220/20 X |
| 4,221,402 | 9/1980 | Kazmark | 280/47.19 X |
| 4,248,453 | 2/1981 | Stark | 280/47.17 X |

Primary Examiner—Robert J. Spar
Assistant Examiner—Donald W. Underwood
Attorney, Agent, or Firm—Gifford, Van Ophem, Sheridan and Sprinkle

[57] ABSTRACT

A novel game carrier disclosed for conveniently transporting game away from the hunt site. The game carrier comprises a pair of rail members wherein each rail member further comprises a plurality of telescoping tubular sections. The tubular sections are movable from a nested position for compact storage and to an extended position for transporting game. Detachable pins extend through registering bores in the tubular sections to lock them together in their extended position and simultaneously secure a plurality of cross supports between the rail members. In use, the game is tied to the rail members and cross supports while a pair of wheels are rotatably mounted to one end of the rail members to facilitate transporting the game from the hunt site.

4 Claims, 6 Drawing Figures

U.S. Patent    Feb. 15, 1983    Sheet 2 of 2    4,373,737
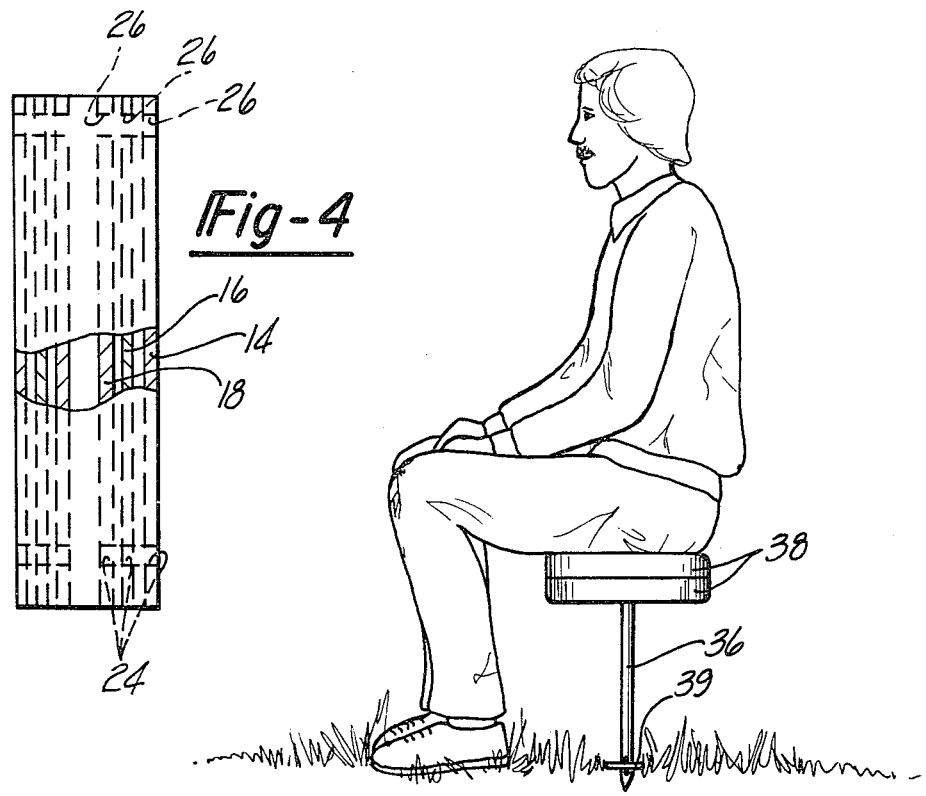
Fig-4
Fig-5
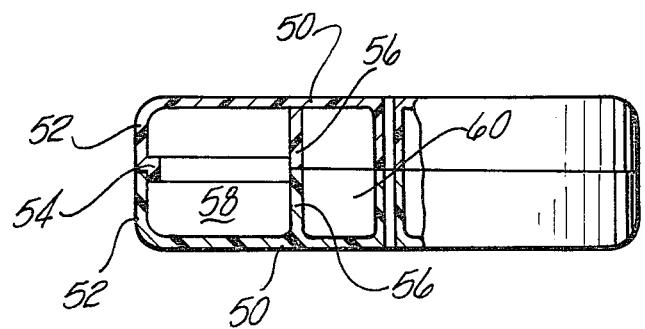
Fig-6

GAME CARRIER

BACKGROUND OF THE INVENTION

I. Field of the Invention

The present invention relates to an improved game carrier for transporting game from the hunt site.

II. Description of the Prior Art

In order to hunt many types of game, for example, deer, it is often necessary for hunters to travel an appreciable distance away from civilized areas in order to find the game. Once the game has been killed, however, it is necessary to transport the game away from the hunt site.

Many hunters simply drag the game along the ground away from the hunt site. This solution, however, is less than satisfactory, particularly when the game is heavy, since it is very hard work to drag the game an appreciable distance. Furthermore, the pelt is often damaged when dragging the game along the ground.

There have, however, been previously known game carriers for transporting game away from the hunt site. These previously known game carriers, however, are of a heavy and bulky construction and the carrier must be transported both to and from the game site even if its use is not required. For these reasons, these previously known game carriers have not enjoyed wide spread acceptance or use.

SUMMARY OF THE PRESENT INVENTION

The present invention overcomes the above mentioned disadvantages of the previously known game carriers by providing a lightweight game carrier which can be readily assembled and disassembled and, when disassembled, compactly stored.

In brief, the game carrier according to the present invention comprises a pair of rail members and each rail member comprises a plurality of telescopic tubular sections. The telescopic tubular sections are movable between a nested position for compact storage and an extended position for carrying game.

Each tubular section includes a transverse bore formed through each end so that, when the tubular sections are in their extended position, a pin is extended through the registering bores in opposite ends of adjacent tubular sections to lock these tubular sections together. In addition, at least two and preferably more cross supports extend transversely between the rail members when in their extended position to lock the rail members together and form a ladder like frame on which the game can be attached.

A pair of wheels are detachably mounted by an axle to one end of the rail members so that the wheels contact the ground and facilitate transporting the game carrier. In addition, these wheels when detached from the rail members can be secured together and form a storage compartment for food, accessories and the like.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 4 is a side view showing a portion of the game carrier in its storage position;

FIG. 5 is a side view illustrating still a further use of a portion of the game carrier of the present invention; and FIG. 6 is a fragmentary sectional view showing still a further use of a portion of the game carrier of the present invention.

DETAILED DESCRIPTION OF A PREFERRED EMBODIMENT OF THE PRESENT INVENTION

Figure 1:
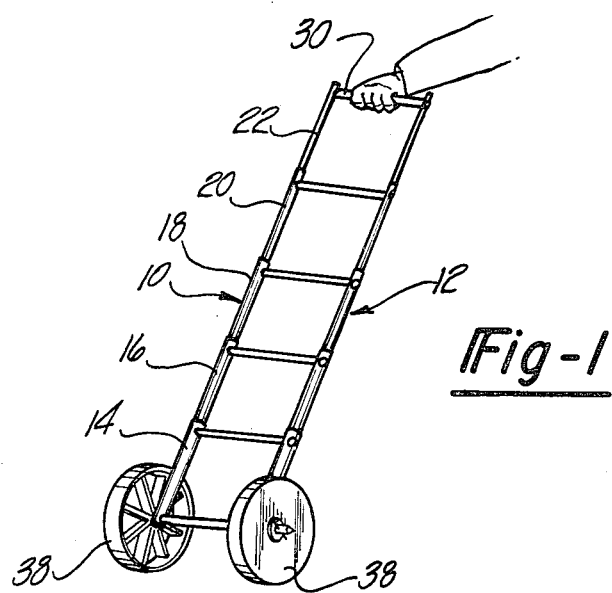
FIG. 1 is a perspective view illustrating a preferred embodiment of the game carrier of the present invention.
Figure 2:
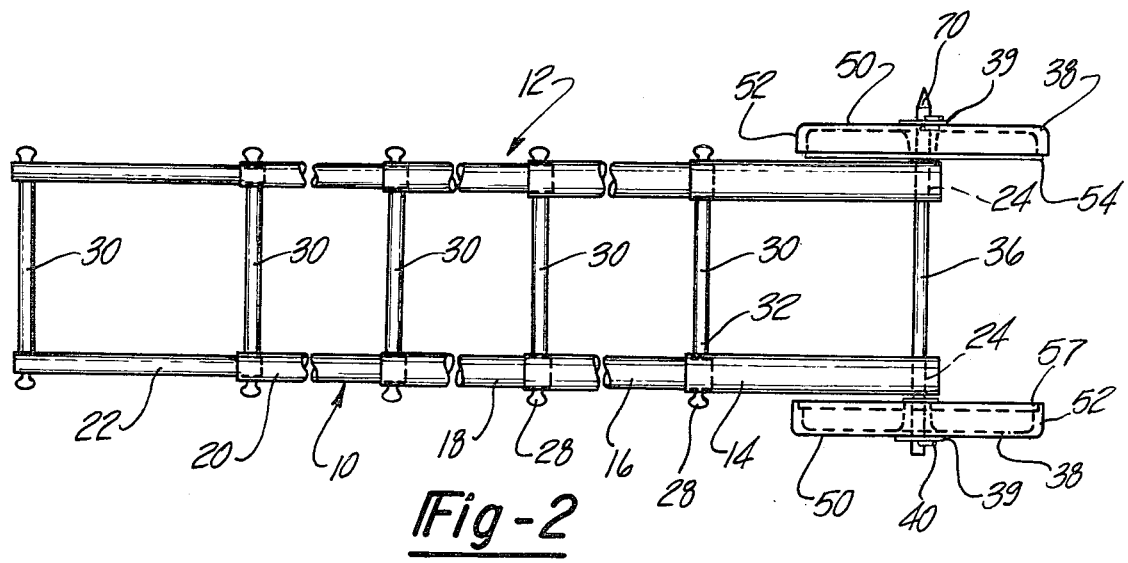
FIG. 2 is a plan view of the preferred embodiment of the game carrier of the present invention.
Figure 3:
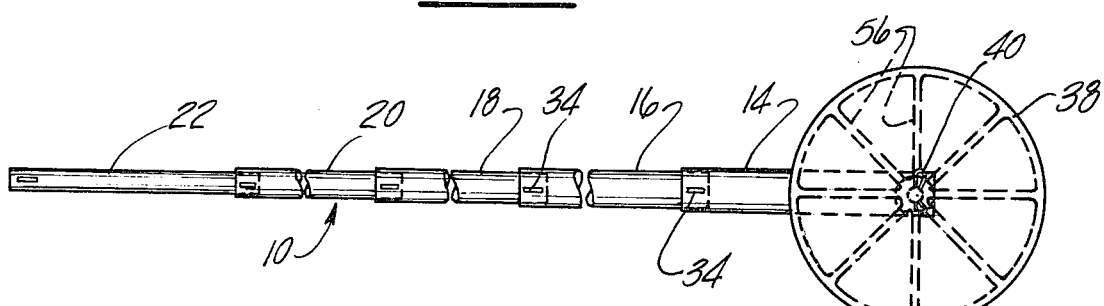
FIG. 3 is a side view thereof.

With reference first to FIGS. 1-3, a preferred embodiment of the game carrier of the present invention is thereshown and comprises a pair of rail members 10 and 12 which are substantially identical to each other. Consequently, only one rail member 10 will be described in detail, it being understood that a like description shall also apply to the other rail member 12.

The rail member 10 further comprises a plurality of tubular sections 14, 16, 18, 20 and 22. The tubular sections are preferably cylindrical in cross sectional shape and may be constructed of any suitable rigid material, such as aluminum. Moreover, although the rail member 10 is shown as comprising five separate tubular sections 14–22, more or fewer tubular sections 14–22 can be employed without deviation from the spirit or scope of the invention.

With reference particularly to FIGS. 2 and 4, the tubular sections 14–22 progressively decrease in cross sectional size from the tubular section 14 and to the tubular section 22 so that the tubular section 16 can be slidably received within to tubular section 14 and so on for the rest of the tubular sections 18–22. Consequently, the tubular sections 14–22 are telescopically mounted within each other and movable from the nested position, illustrated in FIG. 4, and to an extended position illustrated in FIG. 2. Preferably, each tubular section 14–22 is of the same length and, when in their extended position, only a portion of the lower end of one section is positioned within the interior of the next adjacent section.

Still referring to FIGS. 2 and 4, a transverse bore 24 is formed through the lower end of each tubular section 14–22 and, similarly, a transverse bore 26 is formed through the upper end of each tubular section 14–22. When the tubular sections 14–22 are moved to their extended positions, the upper transverse bore 26 of the larger tubular section registers with the lower transverse bore 24 of the next smaller tubular section. A pin 28 is then positioned through the registering transverse bores 24 and 26 to lock the adjacent tubular sections together in their extended position.

With reference now particularly to FIG. 2, a plurality of cross supports 30 are positioned between the rail members 10 and 12 thus forming a ladder like structure. Each cross support 30 includes a threaded axial bore 32 at each end while the pins 28 include a threaded end (not shown) which threadably engages the bore 32. Thus, by tightening the pins 28, the pins 28 not only lock the tubular sections 14–22 in their extended position relative to each other, but also lock the rail members 10 and 12 to the cross supports 30 which maintains the rail members 10 and 12 in a generally spaced apart and parallel relationship. Each pin 28 also includes a flat portion 34 (FIG. 3) at its outer end to facilitate the attachment and detachment of the pins 28 to the cross supports 30.

With reference now particularly to FIGS. 2 and 3, an elongated axle 36 is rotatably positioned through the transverse bores 24 in the largest tubular section 14. Therafter, a pair of cotter pins 40 or the like are used to detachably connect two wheels 38 and two washers 39 to the axle 36 so that the wheels 38 can rotate with respect to the rail members 10 and 12. Each washer 39 is relatively large in diameter, e.g., 4 inches, and is sandwiched between one wheel 38 and retains the wheel 38 on the axle 36.

In operation, the game carrier of the present invention can be rapidly disassembled by merely unscrewing the pins 28 from the cross supports 30 and also by removing the wheels 38 from the axle 36. Thereafter, the tubular sections 14–22 of the rail members 10 and 12 are moved to their nested position (FIG. 4) for compact storage of the rail members 10 and 12. The rail members 10 and 12, the cross supports 30 and the other components of the game carrier can then be conveniently stored and carried within a hunter's knapsack or other appropriate receptacle.

When it becomes necessary to transport the game, the tubular sections 14–22 are moved to their extended position and the cross support members 30 are secured to the rail members 10 and 12 by the threaded pins 28. Thereafter, the wheels 38 and axle 36 are rotatably mounted to the rail members 10 and 12 in the previously described fashion. The game is then tied to the rail members 10 and 12 and cross supports 30 whereupon the game can be wheeled away from the hunt site.

Referring now particularly to FIGS. 2, 3 and 6, in the preferred form of the invention each wheel includes a circular side wall 50 and an annular rim 52 which extends outwardly around the outer periphery of the side wall 50. In addition, the wheels 38 are preferably constructed of a plastic material and one wheel 38 has a lip 54 which can be lockingly received within a recess 57 on the other wheel 38 so that the wheels can be snapped together. Each wheel 38 further includes a plurality of radially extending reinforcing walls 56.

With the wheels 38 snapped together as shown in FIG. 6, a storage chamber 58 is formed between the wheels 38. In addition, with the reinforcing walls 56 registering with each other, this chamber 58 is divided into a plurality of subchambers 60 in which the threaded pins 28, cotter pins 40, food, or other articles can be conveniently stored when use of the game carrier is not required.

Referring now particularly to FIGS. 2 and 5, preferably one end 70 of the axle 36 is pointed and can be inserted into the ground as shown in FIG. 5 so that the axle 36 extends generally vertically. In doing so, one washer 39 flatly abuts against the ground while the wheels 38 form a rotatable seat for the hunter and without the necessity of separating the wheels 38.

From the foregoing it can be seen that the game carrier of the present invention provides a convenient, lightweight and inexpensive carrier for transporting game away from the hunt site and which can be conveniently compactly stored when not in use in a knapsack or other receptacle. Furthermore, the wheels of the game carrier, when not in use, provide a convenient means for storing small articles, such as food, when not in use. Furthermore, with the wheels 38 assembled to the axle 36, the wheels and axle together form a rotatable seat for the hunter.

Having described our invention, however, many modifications thereto will become apparent to those skilled in the art to which it pertains without deviation from the spirit of the invention as defined by the scope of the appended claims.

We claim:

1. A game carrier comprising:
   a pair of extendable rail members, each rail member being movable between a contracted position and an extended position,
   means for selectively locking each rail member in its extended position,
   at least two cross supports attached in a spaced apart relationship transversely between said rail members when said rail members are in their extended position,
   a wheel detachably rotatably mounted to one end of each rail member, said wheels being axially aligned with each other, and
   wherein each wheel further comprises a circular side wall and an annular rim extending axially outwardly from one side of the outer periphery of the side wall, and means for detachably locking the free edge of the wheel rims together thus forming a storage chamber therebetween.

2. The invention as defined in claim 1 wherein each wheel further comprises a plurality of radially extending walls on said side of said sidewall to thereby divide said storage chamber into a plurality of subchambers.

3. A game carrier comprising:
   a pair of extendable rail members, each rail member being movable between a contracted position and an extended position,
   means for selectively locking each rail member in its extended position,
   at least two cross supports attached in a spaced apart relationship transversely between said rail members when said rail members are in their extended position,
   a wheel detachably rotatably mounted to one end of each rail member, said wheels being axially aligned with each other,
   an axle extending through registering holes at one end of each rail member, said wheels being detachably connected to opposite ends of said axle,
   wherein one end of the axle is pointed and protrudes outwardly from one wheel so that with said pointed axle end implanted in the ground, the other wheel forms a seat at the other end of the axle.

4. The invention as defined in claim 3 wherein said seat is rotatable.

* * * * *